(12) United States Patent
Inanami et al.

(10) Patent No.: US 7,079,994 B2
(45) Date of Patent: Jul. 18, 2006

(54) METHOD AND SYSTEM FOR PRODUCING SEMICONDUCTOR DEVICES

(75) Inventors: Ryoichi Inanami, Kawasaki (JP);
Shunko Magoshi, Yokohama (JP);
Katsuya Okumura, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 764 days.

(21) Appl. No.: 09/912,398

(22) Filed: Jul. 26, 2001

(65) Prior Publication Data
US 2002/0013930 A1    Jan. 31, 2002

(30) Foreign Application Priority Data
Jul. 27, 2000    (JP)    ............... 2000-227324

(51) Int. Cl.
G06G 7/34     (2006.01)
G06F 7/02     (2006.01)
G06F 9/44     (2006.01)
G06F 15/82    (2006.01)

(52) U.S. Cl. .......................... 703/6; 707/103; 705/25; 717/104

(58) Field of Classification Search ............ 703/2, 703/20, 6; 700/105–107, 19, 182, 103; 716/21, 716/17, 10, 11; 705/28, 29, 26; 707/103; 717/104
See application file for complete search history.

(56) References Cited

U.S. PATENT DOCUMENTS

| | | | | |
|---|---|---|---|---|
| 4,310,743 A * | 1/1982 | Seliger | ............. | 219/121.12 |
| 5,341,302 A * | 8/1994 | Connors et al. | ............. | 700/102 |
| 5,512,765 A * | 4/1996 | Gaverick | ............. | 257/202 |
| 5,539,652 A * | 7/1996 | Tegethoff | ............. | 703/14 |
| 5,629,845 A * | 5/1997 | Liniger | ............. | 700/67 |
| 5,663,891 A * | 9/1997 | Bamji et al. | ............. | 716/2 |
| 5,971,585 A * | 10/1999 | Dangat et al. | ............. | 700/102 |
| 6,090,528 A * | 7/2000 | Gordon et al. | ............. | 430/296 |
| 6,110,213 A * | 8/2000 | Vinciarelli et al. | ............. | 703/1 |
| 6,162,581 A * | 12/2000 | Nakasuji et al. | ............. | 430/296 |
| 6,169,992 B1 * | 1/2001 | Beall et al. | ............. | 707/103 R |
| 6,307,209 B1 * | 10/2001 | Nakasuji et al. | ............. | 250/492.22 |
| 6,363,488 B1 * | 3/2002 | Ginter et al. | ............. | 713/201 |
| 6,560,768 B1 * | 5/2003 | Inanami et al. | ............. | 716/21 |
| 6,578,174 B1 * | 6/2003 | Zizzo | ............. | 716/1 |
| 6,801,881 B1 * | 10/2004 | Shah | ............. | 703/2 |
| 6,823,294 B1 * | 11/2004 | Guthrie | ............. | 703/2 |
| 2001/0041297 A1 * | 11/2001 | Nishi | ............. | 430/5 |

OTHER PUBLICATIONS

Hart et al, "Inter-Organization Computer Networks: Indications of Shifts in Interdependence", ACM SIGOIS Bulletin, Proceedings of the conference on Office information systems, vol. 11 Issue 2-3, Mar. 1990.*

(Continued)

*Primary Examiner*—Paul L. Rodriguez
*Assistant Examiner*—Tom Stevens
(74) *Attorney, Agent, or Firm*—Finnegan, Henderson, Farabow, Garrett & Dunner, L.L.P.

(57) ABSTRACT

A user is requested to input specifications of a semiconductor device. Based on the specifications, a plurality of circuit patterns are generated by a CP method, and a design parameter is calculated for each of the circuit patterns. The user is provided with information of the plurality of circuit patterns together with the design parameters. The user selects a desired circuit pattern, whereas the server calculates manufacturing costs of the device and presents them to the user. The user checks the costs and then places an order.

5 Claims, 9 Drawing Sheets

OTHER PUBLICATIONS

Ramsay Frank R. "A Remote Design Station for Customer Uncommitted Logic Array Designs",Annual ACM IEEE Design Automation Conference, Nashville, Tennessee, pp.: 498-504, 1981.*

Gomei et al, "A Cost-of-Ownership Study On Lithography Systems", Semiconductor International, Jul. 1, 1998.*

Pfeiffer-H.C., "Electron Beam Lithography: A Key to VLSI" IEEE N.Y., N.Y., p. 186 CPP Conference Paper.*

Inanami, R. et al., "Throughput Enhancem ent Strategy of Maskless Electron Beam Direct Writing for Logic Device", IEEE-2000 Technical Digest pp. 833-836, Dec. 10-13, 2000.

U.S. Appl. No. 09/817,270, filed Mar. 27, 2001, Inanami, R. et al., "Exposure Pattern Data Generation Apparatus Associated with Standard Cell Library and Charged Beam Exposure".

* cited by examiner

Select specifications and operations.
Select desired one from the devices listed below.

256MB DRAM — Overview

1G DRAM — Overview

System LSI — Overview

Others

⎫
⎬ 41
⎭

When operating descriptions of HDL base are prepared, store an operating description file in your terminal and then click the right-side Upload button — Upload Input necessary operations and specifications 42 — Operating frequency    MHz~    MHz
43 — Chip area               mm2~    mm2
44 — Number of products Other operations and specifications OK    Cancel

F I G. 6

| Pattern number | Frequency | Area | Power consumption | Number of masks | Cost | Period |
|---|---|---|---|---|---|---|
| 1 | 632MHz | 3.2×6.8mm2 | 15mW | 3 | ¥1,203,300 | 65 days |
| 2 | | | | | | |
| 3 | | | | | | |
| 4 | | | | | | |
| 5 | | | | | | |
| 6 | | | | | | |
| 7 | | | | | | |
| 8 | | | | | | |
| 9 | | | | | | |
| 10 | | | | | | |

Click left-side check box for desired device and then OK button. If there is no desired one, click Retry or Cancel button. If you click Retry, you can start setting operations and specifications.

[OK]  [Retry]  [Cancel]

F I G. 8

```
The following is an estimate of a desired device.
Check the amount and, if you wish to place an order, input a payment
method and then click OK button.
If not, click Cancel button.

Estimate

OOO,OOO,OOO $

Payment method

[                    ]

[ OK ]              [ Cancel ]
```

METHOD AND SYSTEM FOR PRODUCING SEMICONDUCTOR DEVICES

CROSS-REFERENCE TO RELATED APPLICATIONS

This application is based upon and claims the benefit of priority from the prior Japanese Patent Application No. 2000-227324, filed Jul. 27, 2000, the entire contents of which are incorporated herein by reference.

BACKGROUND OF THE INVENTION

1. Field of the Invention

The present invention relates to a method for producing a semiconductor device by charged-particle beam exposure using a character projection (CP) method and a system for producing the semiconductor device.

2. Description of the Related Art

Electron-beam exposure is an effective means for processing a fine pattern of a semiconductor circuit.

In a variable shaped beam (VSB) method that is a typical electron-beam exposure method, a circuit pattern is divided into very small rectangles and triangles and these are repeatedly exposed to an electron beam. It is thus unnecessary to prepare a mask dedicated to the exposure of the pattern. However, a very large number of shots of the electron beam are required and thus a reduction in throughput is inevitable.

A character projection (CP) method is contrived in order to improve the throughput of the VSB method. In the CP method, the charged-particle beam is formed to characters within a maximum size of the beam. The characters are exposed by the electron beam at once, thereby reducing the number of shots of the beam and improving the throughput. The electron beam is formed by a character-shaped CP aperture. In a commonly used electron-beam exposure apparatus, the number of apertures that can be formed in a deflection region of a character-selecting deflector is 100 at the most. In a device which has a number of same patterns which is used repeatedly such as a memory, most of the patterns can be exposed by the CP method. In a logic device such as an ASIC (application-specific integrated circuit), the number of types of characters used repeatedly is as large as several hundreds to several thousands. The VSB method is therefore used more frequently than the CP method to expose the characters. If the VSB method increases in use, the effect of reducing the number of shots, which is created by adopting the CP method, is lessened naturally; therefore, a high throughput cannot be achieved. Since a CP aperture is required for each product, manufacturing costs cannot be decreased, nor can be time periods.

In producing a logic device as described above, especially a circuit pattern designed on the basis of standard cells (SC), a logic synthesis method and an P & R (Place and Route) method are proposed, which greatly reduces the number of standard cells (SC) serving as characters when electron-beam exposure is performed by the CP method or the number of standard cells for use is restricted. According to these methods, the performance of the circuit pattern slightly deteriorates and the area of a chip does not decrease. However, the number of shots of electron-beam exposure can be reduced and the number of characters for exposure of the CP method can be made equal to or smaller than that of characters, which can be prepared by an exposure apparatus. The same CP aperture can be used for different logic devices. A mask or a CP aperture need not be produced for each product, with the result that manufacturing costs and periods can be decreased.

According to the above design method, a plurality of patterns can be generated for desired device specifications. The most desirable pattern can thus be selected in terms of costs, delivery times, and capabilities. For example, the following five conditions are provided as pattern selection criteria in this case:

1) The number of shots of electron beam is the smallest or the throughput of exposure is the highest.

2) Electron beam exposure is performed using a previously formed CP aperture.

3) The chip area of a device to be manufactured is the smallest.

4) The power consumption of a device to be manufactured is the lowest.

5) The operating frequency of a device to be manufactured is the highest.

It is preferable that a person who makes a request to manufacture a device, i.e., a user or a customer of a semiconductor manufacturer decides which condition is prioritized and a logic device of what circuit pattern is produced.

A conventional process from the design of a circuit pattern of a semiconductor device to the electron-beam exposure of the circuit pattern will now be described with reference to the flowchart shown in FIG. 1.

As FIG. 1 shows, an electronic circuit of the semiconductor device is described first (s101). It is usually described using hardware description language (HDL). In particular, register transfer level (RTL) is employed to describe the arrangement and operation of registers and those of register-to-register logic circuits.

Then, logic synthesis is performed based on device characteristics such as the RTL and an operating frequency and design limiting conditions such as a chip area (s102). A logic circuit satisfying the design limiting conditions can thus be obtained. A circuit pattern is formed on the basis of the logic circuit. A functional unit such as a logic gate and a flip-flop is assigned to standard cells for optimizing a circuit pattern. These standard cells are arranged on a chip and connected to each other by wiring. This arrangement is called P & R (Place and Route).

After that, various verifications are performed to generate pattern data of the device (s103).

The above steps s101 to s103 are carried out by a designer of the circuit pattern. The step s104 and its subsequent steps are performed by a process engineer as follows.

First, an operator receives pattern data from the designer of the circuit pattern (s104) and extracts figures, which serves as characters for CP exposure or is used repeatedly, from the figures contained in the pattern data. The extracted figures is assigned to the characters for CP exposure, while the number of characters mountable on an exposure apparatus is set as a limit value (s105). The other figures is exposed by the VSB method.

A CP aperture is prepared for the characters to which the figures is assigned (s106). Based on information of steps s104 and s105, design information is converted to exposure data that can be put to an electron-beam exposure apparatus using pattern data (s107). The CP aperture formed in step s106 is attached to the exposure apparatus. The exposure data generated in step s107 is input to the exposure apparatus, and a sample coated with resist for processing is exposed to an electron beam (s108). The completely exposed sample is removed from the exposure apparatus and then heated and developed to form a resist pattern (s109).

In the foregoing techniques of designing a circuit pattern and exposing the pattern to an electron beam, the steps s101 to s103 are usually carried out by a designer of the circuit pattern, while the steps s104 to s109 are performed by a process engineer. It is not one person but a plurality of persons of different types who are in charge of the respective steps. The designer designs a circuit pattern without considering any characters in the electron-beam exposure of the CP method. On the other hand, the process engineer extracts figures as a unit of the CP exposure and assigns it to the characters. However, the designer cannot take into consideration all the contents that are subject to constraints in terms of a process. Consequently, the designer and engineer are satisfied with the parameters for the process and design, but they have no other choice but to take a very inefficient exposure method for the other parameters. This leads to the design and exposure method that do not necessarily meet the user's needs in manufacturing a semiconductor device. More specifically, when a user instructs a semiconductor-device maker to manufacture a semiconductor device performing a desired operation, the designer selects a circuit pattern that satisfies the optimum design condition based on the operation. Then, the process engineer makes the exposure device to expose the circuit pattern selected by the designer which is made by an electron beam. The above process therefore has the problem that the manufacturing costs and periods cannot meet the needs of a user. In other words, though the above five conditions 1) to 5) are provided as pattern selection criteria, the user's pattern selection is based on very limited parameters for design.

BRIEF SUMMARY OF THE INVENTION

According to an aspect of the present invention, there is provided a method of producing a semiconductor device upon receiving an order for the semiconductor device by transferring information between a person who wishes to receive an order and a person who wishes to place an order through a network, the method comprising: causing the person who wises to place an order to input specifications of the semiconductor device by request of the person who wishes to place an order, generating a plurality of circuit patterns in consideration of conditions for transferring a pattern by charged-particle beam exposure of a character projection method based on the specifications of the semiconductor device, obtaining at least two design parameters for each of the circuit patterns, and presenting the at least two design parameters to the person who wishes to place an order for each of the circuit patterns and causing the person who wishes to place an order to select a circuit pattern satisfying a desired condition.

The specifications of semiconductor devices represent conditions for specifying the semiconductor devices when a person receives an order for the semiconductor devices before logic synthesis and P & R are performed. The conditions include design parameters such as an operating frequency, a chip area, and power consumption.

The design parameters include parameters such as manufacturing costs and delivery time periods, which are referred to as conditions for receiving an order for semiconductor devices, as well as parameters necessary for designing a semiconductor device, such as an operating frequency, a chip area, and power consumption and parameters necessary for electron-beam exposure such as throughput, the number of shots, and the number of CP apertures for use. In other words, the design parameters are all the parameters used for determining whether a person receives an order or not.

The present invention is also realized as a semiconductor-device producing system for achieving the above method.

And the present invention is realized as a program product for causing a computer system to produce the semiconductor device. The program product has a recording medium, and at least one instruction means which is operated by the computer system and is recorded on the recording medium.

Besides, the present invention is realized as a data signal which is embodied by a carrier for allowing a semiconductor device to be produced. The data signal comprises at least one program code portion which is configured to do the same as above described semiconductor-device producing method.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 6 shows an example of a screen for selecting from among device operations and specifications displayed on a user terminal of the semiconductor-device production system according to the first embodiment;

FIG. 8 shows an example of a screen for selecting a pattern displayed on the user terminal of the semiconductor-device production system according to the first embodiment;

DETAILED DESCRIPTION OF THE INVENTION

An embodiment of the present invention will now be described with reference to the accompanying drawings.

(First Embodiment)

Figure 1:
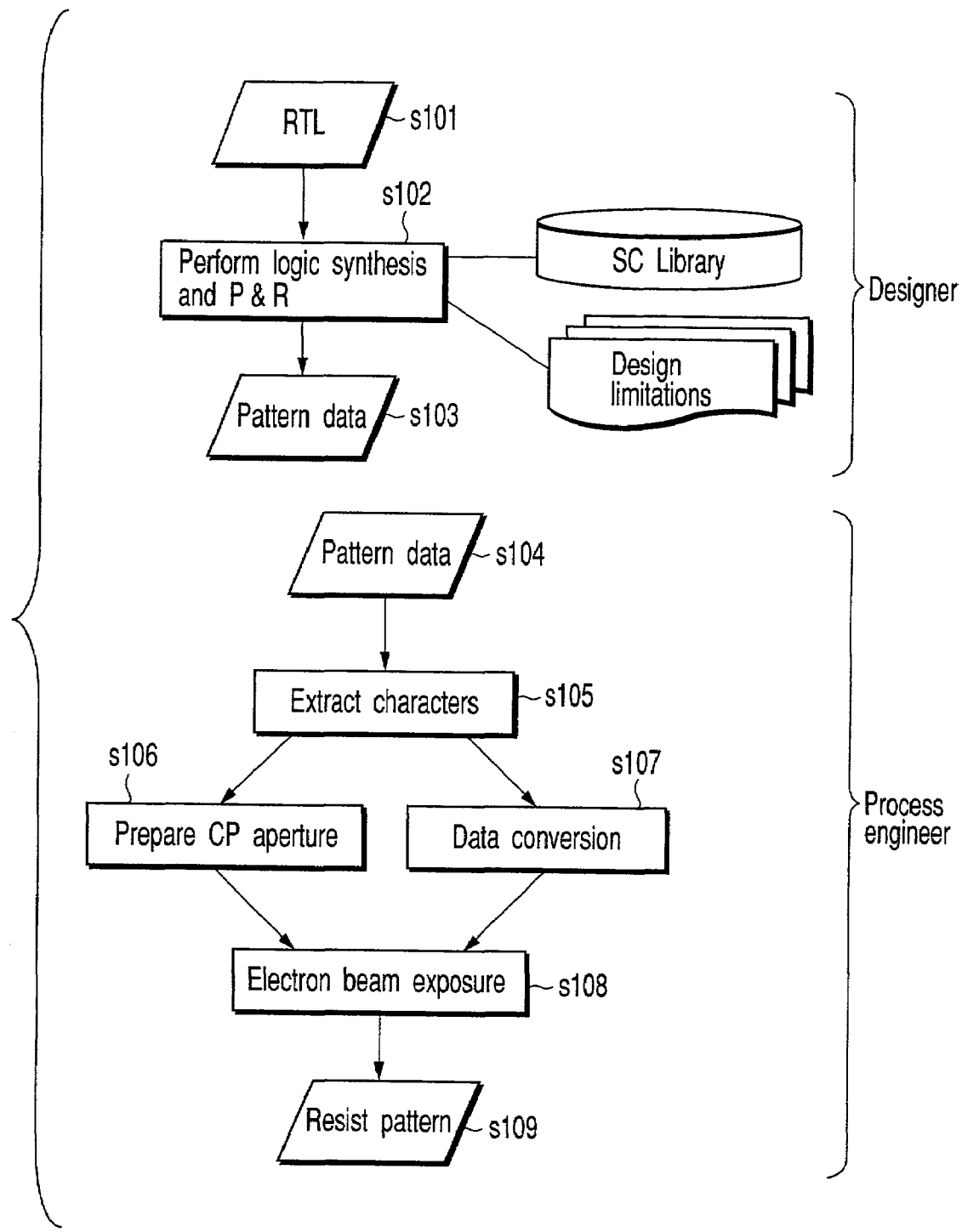
FIG. 1 is a flowchart showing a prior art process of producing a semiconductor device.
Figure 2:
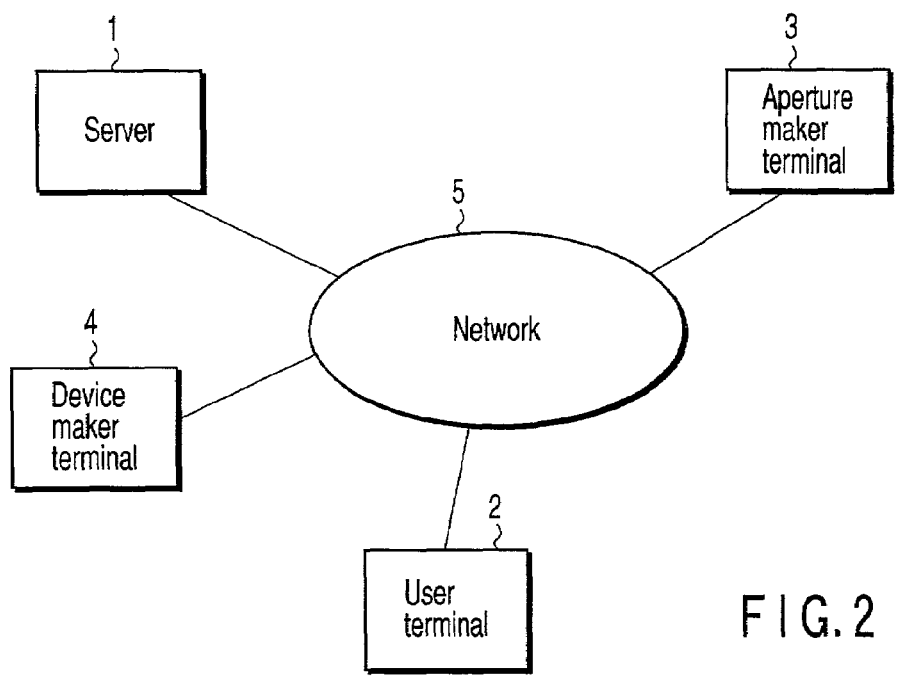
FIG. 2 is a block diagram showing a network structure of a semiconductor-device production system according to a first embodiment of the present invention.

FIG. 2 shows a network structure of a semiconductor-device production system according to a first embodiment of the present invention. This production system includes a server 1, a user terminal 2, an aperture maker terminal 3, a device maker terminal 4, and a network 5.

The server 1 is a server operated by a system operator for operating the production system as a person who wishes to receive an order. The user terminal 2 is a terminal used by a plurality of users for using the production system as a person who wishes to place an order. The aperture maker terminal 3 is a terminal used by an aperture maker who produces apertures based on an order by the server 1. The device maker terminal 4 is a terminal used by a device maker who produces devices based on an order by the server 1. The server 1, user terminal 2, aperture maker terminal 3, and device maker terminal 4 are connected to the network 5. This connection can be established by wire or radio. Further, the server 1 can directly be connected to an exposure control computer for controlling an exposure apparatus installed in a factory of the device maker or the aperture maker, not through the network 5 but through a private line.

Figure 3:
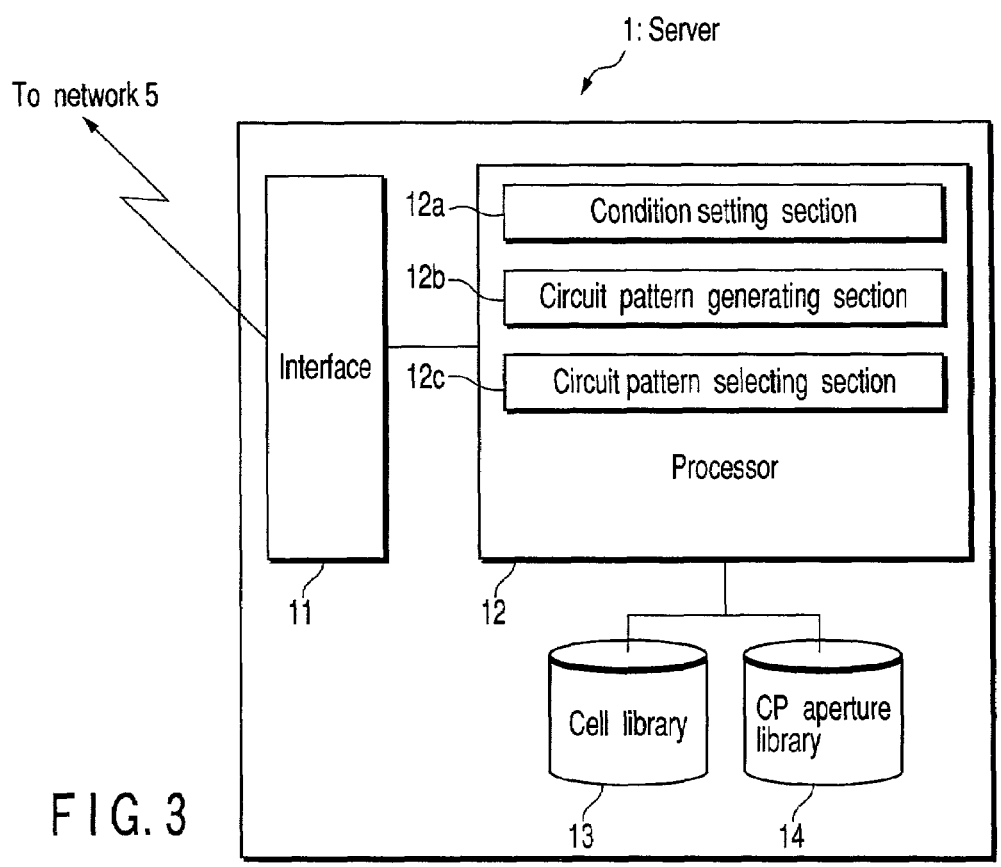
FIG. 3 is a block diagram showing in detail an example of a server of the semiconductor-device production system according to the first embodiment.

FIG. 3 shows an example of the server 1 in detail. Referring to FIG. 3, an interface 11 for communicating data with the network 5 is connected to a processor 12 for processing various data items. The processor 12 is connected to a cell library 13 and a CP aperture library 14. The CP aperture library 14 can directly be connected to the above exposure control computer via a private line.

The processor 12 includes a condition setting section 12a, a circuit pattern generating section 12b, and a circuit pattern selecting section 12c. The condition setting section 12a causes a user to input or select operations and specifications of a semiconductor device to set basic conditions for forming a circuit pattern. The circuit pattern generating section 12b generates a plurality of circuit patterns based on the operations and specifications selected by the user. The section 12b also calculates design parameters of the circuit patterns. The pattern selecting section 12c provides the user with the circuit patterns generated by the section 12b together with the design parameters thereof and causes the user to select one of the circuit patterns.

The cell library 13 stores a plurality of standard cells for optimizing a circuit pattern for each functional unit. Combining these standard cells thus generates a circuit pattern.

The CP aperture library 14 stores a plurality of CP apertures as design data, the CP apertures being used for electron-beam exposure in the CP method. With the CP apertures stored in the CP aperture library 14, a circuit pattern can be designed by combining the VSB and CP methods.

Figure 4:
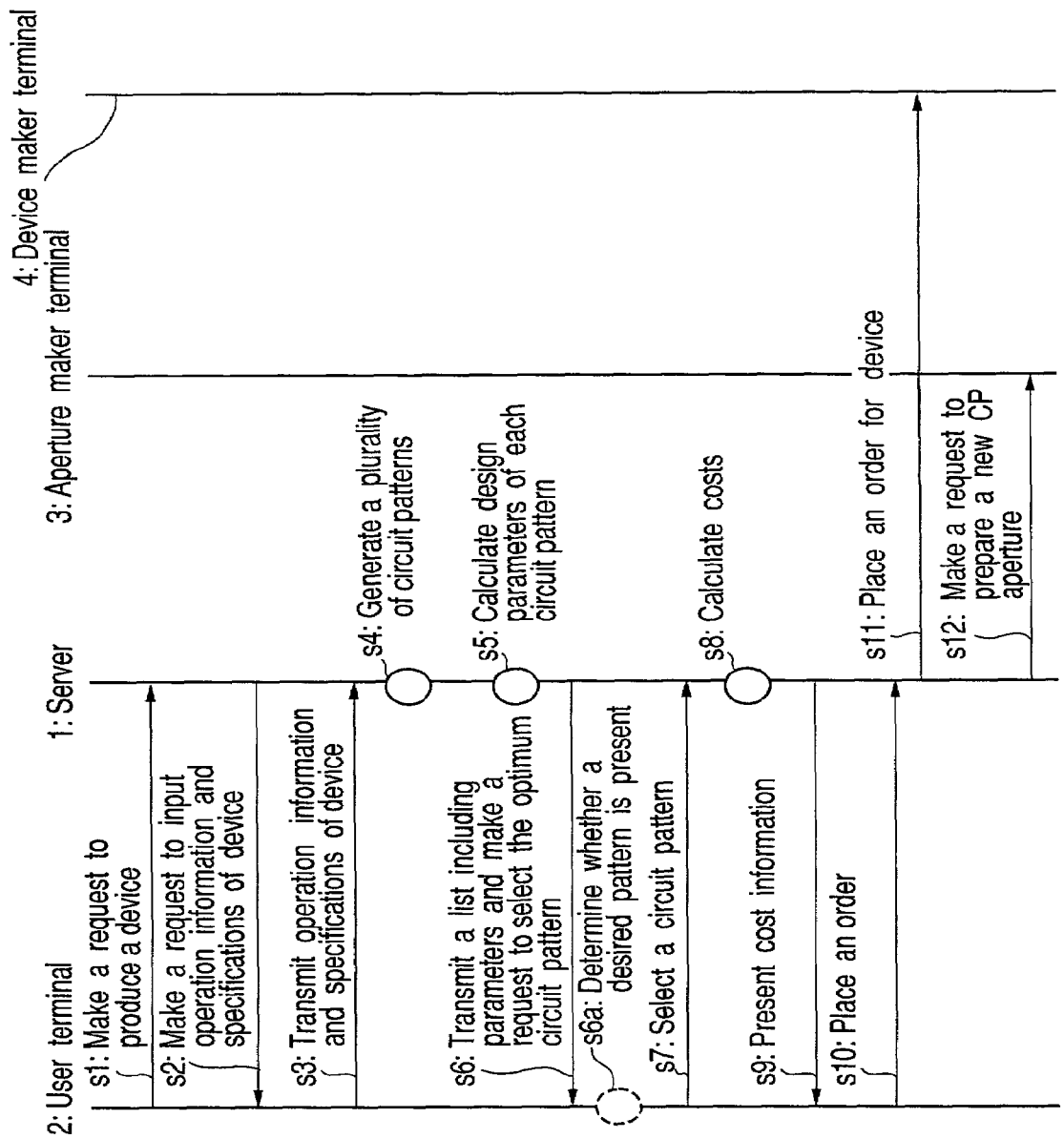
FIG. 4 is a timing chart showing an operation of the semiconductor-device production system according to the first embodiment.
Figure 5:
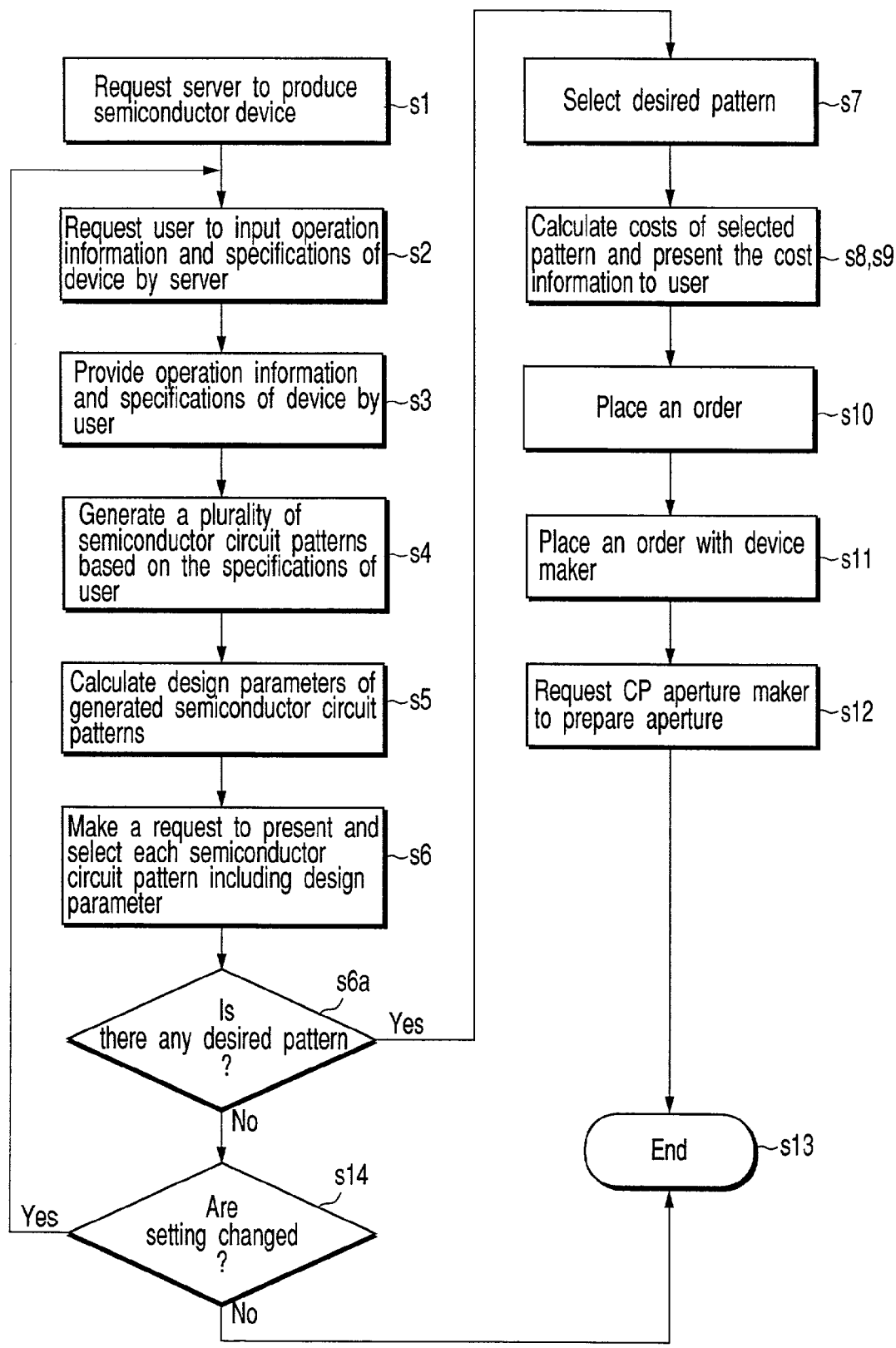
FIG. 5 is a flowchart showing an operation of the semiconductor-device production system according to the first embodiment.

An operation of the semiconductor-device production system according to the first embodiment will now be described with reference to the timing chart shown in FIG. 4 and the flowchart shown in FIG. 5. Assume that in this operation data is transferred through the network 5 unless otherwise specified.

First, a user logs on to the server 1 from the user terminal 2 and requests the server 1 to produce a semiconductor device (s1). The condition setting section 12a of the processor 12 provides the user terminal 2 with a device operation/specification selecting screen as shown in FIG. 6 (s2). In FIG. 6, reference numeral 41 indicates a list of a representative device and numerals 42, 43, and 44 denote an operating frequency, a chip area, and the number of products. The number of products can be designated by the number of chips, the number of wafers, the number of lots, and the like. It is desirable that the parameters of design specifications for specifying a user's desirable device, such as an operating frequency and a chip area, be input as not a uniquely-defined value but a value falling within a given range, e.g., 600 MHz to 620 MHz or 600 MHz or higher in the operating frequency. When the user describes an operation of the device in advance using hardware description language (HDL), the user can click a button "Upload" provided in the position of 41 in the screen shown in FIG. 6 and provide the server 1 with the operation. If the user clicks a button "OK," the input data is sent to the server 1 (s3). The user can thus advance to the next step (s4). If the user clicks a button "Cancel," the user can log off the server 1.

The circuit pattern generating section 12b of the server generates semiconductor circuit patterns based on design specifications such as an operating frequency, a chip area, and the number of products transmitted from the user terminal 2 (s4).

Figure 7:
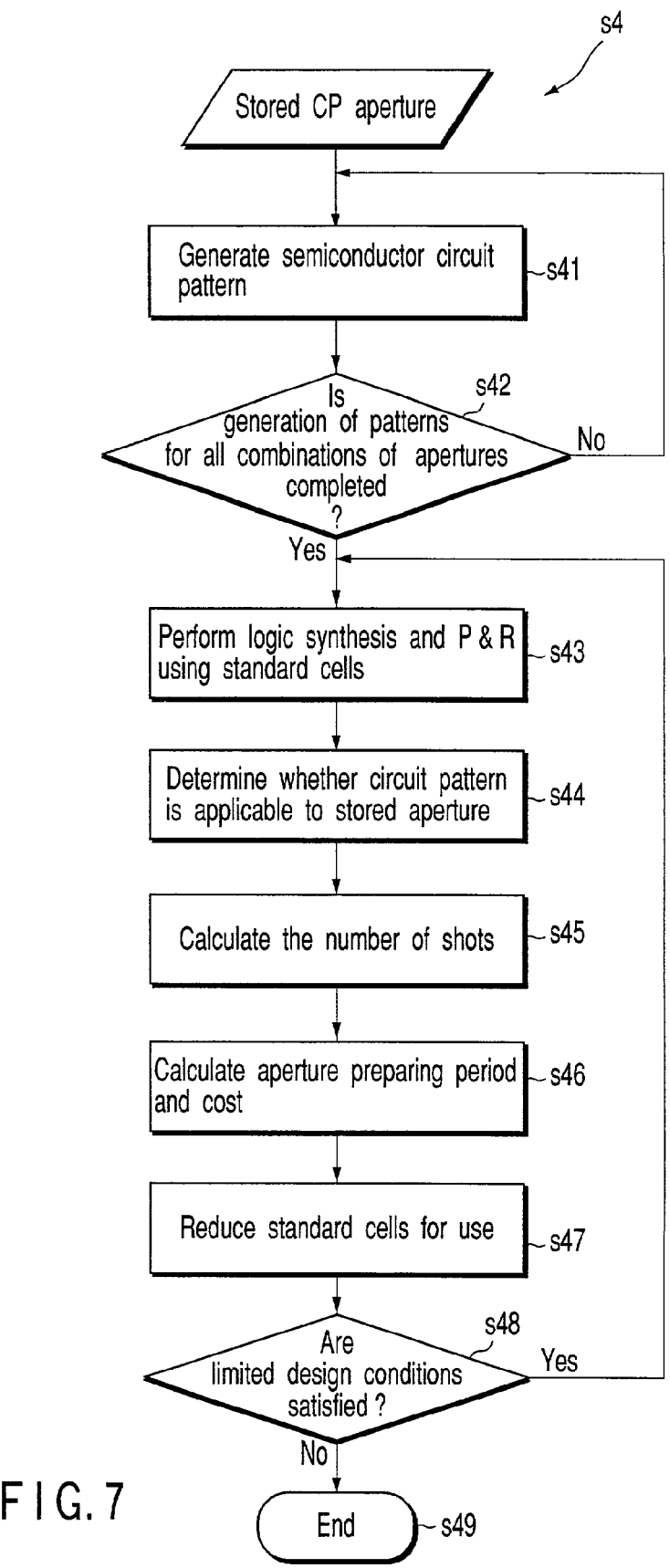
FIG. 7 is a flowchart showing a process of generating a semiconductor-circuit pattern in the server of the semiconductor-device production system according to the first embodiment.

FIG. 7 is a flowchart showing a process of generating a semiconductor-circuit pattern in the circuit pattern generating section 12b.

Assume that a circuit pattern is formed by electron-beam exposure of the CP method. The generation of a pattern is tried using only the standard cells arranged on the CP apertures stored in the CP aperture library 14 (s41). The CP apertures stored in the CP aperture library 14 correspond to those mounted on the actual electron-beam exposure apparatus. Based on the stored CP apertures, information of standard cells prepared in the CP aperture to be mounted actually can be acquired. In other words, a pattern is generated on the assumption that standard cells requiring a new CP aperture would not be used.

When a plurality of CP apertures are stored in the CP aperture library 14, the generation in the above step (s41) is repeated by the number of combinations of the CP apertures. A pattern is thus formed for each of the combinations. It is thus determined whether a pattern is formed for each of the combinations (s42). If the generation for all the combinations is completed, the flow advances to step s43. If not, a pattern is generated for another combination again (s41).

In step s43, logic synthesis and P & R are performed using all of the standard cells stored in the standard cell library 13 by the normal method, thereby forming a circuit pattern.

In step s44, it is determined whether the formed circuit pattern is applicable to the stored CP aperture, and an inapplicable circuit pattern is assigned to a new CP aperture. In step s45, the number of shots required when the pattern formed in step s43 is exposed to an electron beam of the CP method is counted. With regard to a portion of the pattern is exposed to an electron beam without using any CP aperture, the VSB method is adopted to count the number of shots. Then, costs and periods required for producing the new CP aperture are calculated in step s46. It is then defined in step s47 that one of the standard cells used in the pattern that produces the least effect of reducing the number of shots by the use of the CP method as compared with the use of the VSB method is not used for the next pattern generation.

The above operations of generating a pattern, counting the number of shots, and determining a standard cell that is not used next are repeated. The operations are repeated until a pattern which satisfies user's designated design specifications such as an operating frequency cannot be generated any more, and a pattern is generated in each operation. More specifically, it is determined every pattern generation whether the respective parameters of user's design specifications are satisfied or not (s48). If they are satisfied, the flow returns to step s43 and the number of shots for another generated pattern is counted. If not, the pattern generation ends (s49). In step s48, the parameters designated by the user are calculated for each generated pattern in the determination and the parameters are stored.

A plurality of semiconductor circuit patterns are obtained through the above operation. Design limiting conditions as an operating frequency, a chip area, power consumption, a mask to be prepared or not, manufacturing costs and periods are calculated for each of the patterns (s5). The circuit pattern selecting section 12c displays a list of the generated patterns and the calculated parameters on the screen of the user terminal 2 as shown in FIG. 8 (s6). The mask producing cost and period are calculated in consideration of the CP aperture preparing cost and period (s46).

Figures 9, 10:
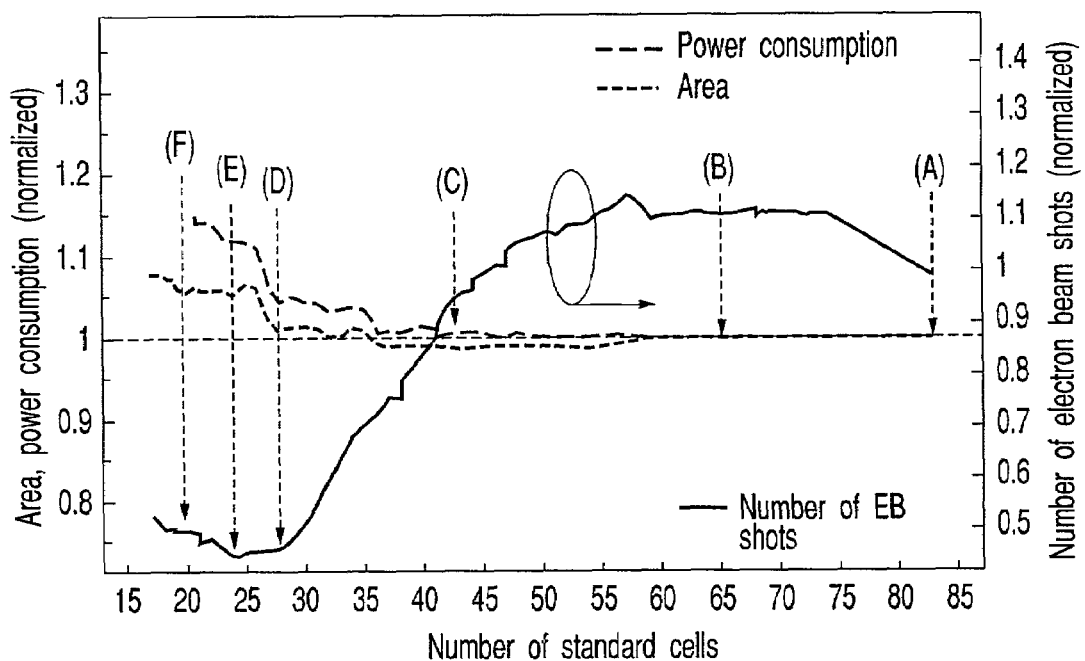
FIG. 9 is a graph showing a relationship between the number of standard cells and the parameters of power consumption, the number of shots, and chip area when the number of standard cells decreases in the semiconductor-device production system according to the first embodiment.
FIG. 10 shows a screen for placing an order displayed on the user terminal of the semiconductor-device production system according to the first embodiment.

FIG. 9 is a graph showing an example of calculating design parameters of the consumption of power, the number of shots, the area of a chip in case of decrement of the number of the standard cells. In this graph, the abscissa axis indicates the number of standard cells and the ordinate axis represents the chip area, power consumption and shot number that are normalized based on a pattern generated without restricting the use of standard cells. Referring to FIG. 9, a pattern is generated under the condition that the designed device can operate at a frequency of 100 MHz, and the number of characters usable in the electron-beam exposure apparatus of the CP method is 100 characters. In other words, the standard cells corresponding to 100 characters can be prepared on the CP aperture, and the part of the pattern which cannot be exposed by the standard cells are exposed by the VSB method.

As shown in FIG. 9, the number of standard cells used when a circuit pattern is designed by a normal method is 84 different types, and the pattern is generated while decreasing the number of standard cells gradually. In FIG. 9, (A) indicates a pattern formed by a normal design method, (B) shows a pattern whose power consumption is the lowest, (C) represents a pattern the area of which is the smallest, (D) denotes a pattern in which the number of shots of an electron beam is sufficiently small and the increase of chip area and power consumption can be allowed, (E) indicates a pattern in which the number of shots of an electron beam is the smallest, and (F) denotes a pattern that can be formed only by a sufficiently small number of standard cells prepared on an already-registered CP aperture. The circuit pattern generating section 12b of the server 1 obtains throughput of electron-beam exposure based on the number of shots of an electron beam for each pattern. The section 12b then obtains a manufacturing cost and period based on the throughput, the presence or absence of a CP aperture to be prepared, the number of lots of a semiconductor device to be manufactured, and the number of wafers.

When the pattern (F) is selected and exposed to an electron beam using the already-existing or registered CP aperture, its chip area increases about 6% and its power consumption increases about 15% as compared with the normally-generated pattern (A), with the result that the semiconductor device deteriorates performance. Since the number of shots of an electron beam can be reduced in almost half and a new CP aperture need not be produced, a CP aperture manufacturing cost and period can be decreased. Of these patterns, the pattern (F) allows a device to be manufactured at lowest costs and highest speeds.

A user determines whether a desired semiconductor circuit pattern is included in a list of patterns with the above design parameters displayed as a criterion of determination (s6a). If the user determines that the desired pattern is included therein, the user clicks a check box on a screen corresponding to the pattern and selects the pattern. If the user then clicks an "OK" button, information of the selected pattern is sent to the server 1 (s7). The server 1 that received the selected-pattern information calculates the final cost of the selected pattern in order to place an order for devices with the pattern (s8). The server 1 transmits data on the cost to the user terminal 2 and displays it on the screen of the terminal 2 as shown in FIG. 10 and causes the user to input a payment method (s9). If the user is satisfied with the cost displayed on the screen shown in FIG. 10, the user inputs a payment method and then clicks the "OK" button. Then, the user officially places an order with the server 1 (s10). The server 1 thus places an order for devices with the device maker terminal 4. The server 1 transmits information about the pattern selected by the user (s11). If necessary, the server 1 requests the aperture maker terminal 3 to produce a new CP aperture (s12). Thus, the operation of receiving/placing an order for semiconductor devices is completed.

The device maker terminal 4 acquires data of a CP aperture for use from the CP aperture library 14 of the server 1. Based on the data, the device maker mounts the CP aperture on the exposure apparatus and starts pattern exposure. If there are any request for producing new CP aperture, the device maker mounts the CP aperture on the exposure apparatus which are provided from the aperture maker not through the network 5.

If there are no patterns with which the user can be satisfied in step s6a, it is determined whether a design for the patterns should be changed by modifying design specification such as the operating frequency and chip area of the device. If the user wants to change the design, the user clicks a "Retry" button on the screen shown in FIG. 8 and returns to step s2 to input the conditions (design specifications) on the screen shown in FIG. 6 again. To complete the design, the user clicks the "Cancel" button to log off the server 1.

According to the present embodiment, a user who makes a request to produce a semiconductor device can directly contact a server of a semiconductor maker through the network 5 and generate a circuit pattern of a desired device by simulation. In this case, the design parameters such as the performance of a device, the area of a chip, and the manufacturing costs and periods, which are required by the user as a criterion of determination for making a request to produce a device, are presented to and selected by the user. The user can thus select and order the most suitable pattern without causing a difference in consciousness among the designer, process engineer, and user. More specifically, though the performance of the device is slightly degraded, a pattern that allows the device to be produced inexpensively and quickly can be selected.

Further, a manufacturing period, which varies with whether an existing CP aperture can be used for electron-beam exposure, can correctly be estimated. Since the use of the existing CP aperture is taken into consideration, the cost and period for manufacturing the CP aperture can be omitted, and the cost can be prevented from increasing even when a small number of devices are produced.

Since, moreover, the server can place an order with a semiconductor maker and a CP aperture maker in real time, the manufacturing period can be shortened.

The present invention is not limited to the above embodiment. For example, the aperture maker terminal 3 or the device maker terminal 4 need not be connected to the network 5 if only the server 1 and user terminal 2 are connected to the network 5. In this case, it is preferable that the device maker terminal 4 be connected to at least the CP aperture library 14 of the server 1 by a private line to receive data.

The server 1 can also be used as a device maker. Specifically, the server 1 can receive an order from a user and produce a pattern based on information of the order as a device maker.

FIG. 8 shows a list of parameters used when a user selects a desired one from among a plurality of circuit patterns. However, as shown in FIG. 9, each of the parameters can be indicated by a line graph that is normalized by a normal design method. Needless to say, the design parameters can be indicated by any other methods such as bar charts if they are presented to a user. In FIG. 8, the design parameters such as an operating frequency are each represented using a unit for actually determining a function of a semiconductor device by a user. However, as shown in FIG. 9, the parameters can be presented together with the normalized values, or only the normalized values can be presented. In this case, it is preferable that a design specification value of the operation and specification of a device provided by a user (s3) be set to 1.

In the above embodiment, semiconductor devices are produced by electron-beam exposure. However, it is needless to say that they can be produced by other charged particle beam exposure such as ion-beam exposure.

In the above embodiment, the VSB method is combined with the CP method. However, a method other than the VSB method can be used. For example, the other methods such as a so-called single-stroke method using a point beam can be combined with the CP method.

Figure 11:
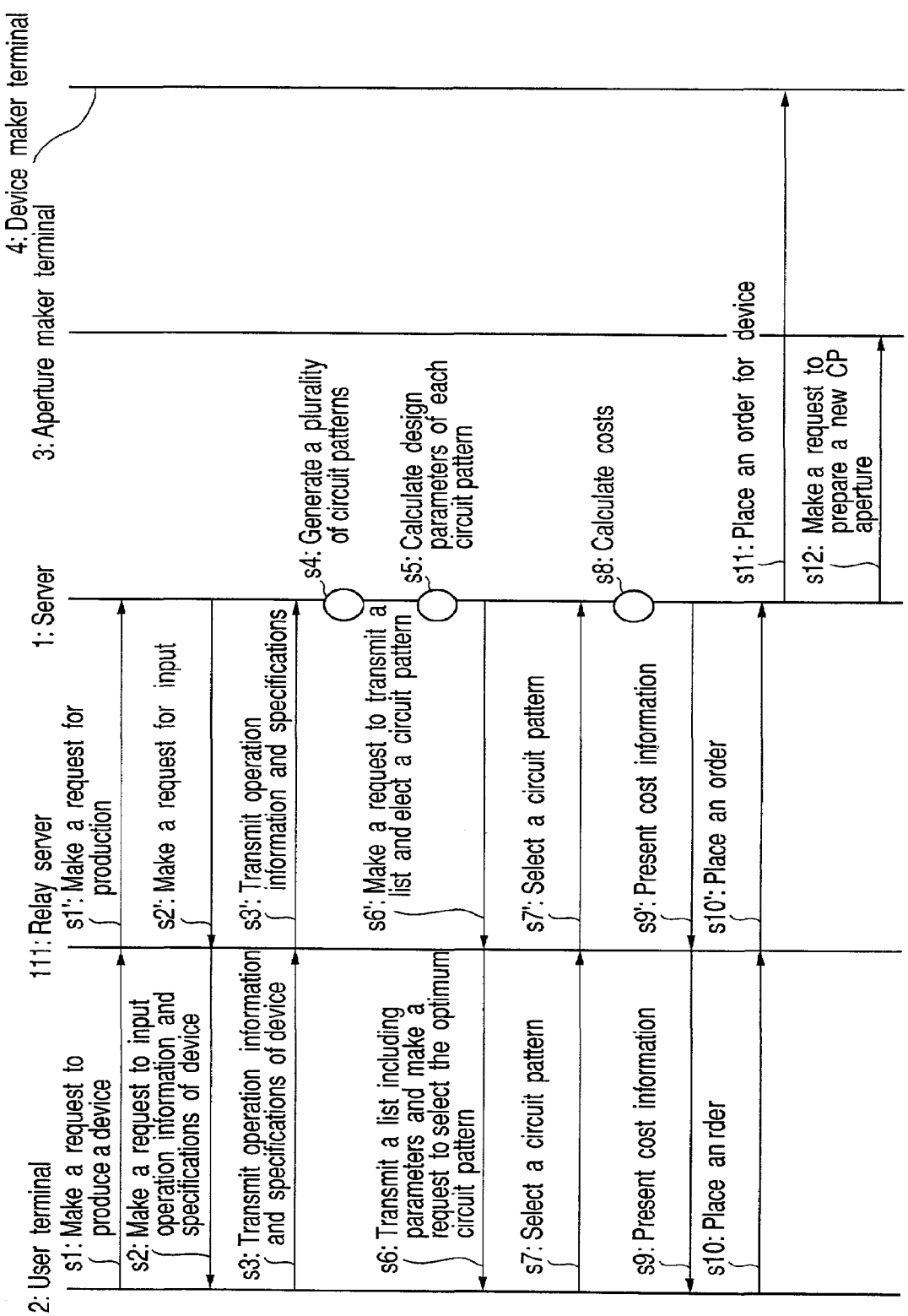
FIG. 11 is a chart showing a modification to the first embodiment in which a relay server is provided between the server and the user terminal.

In the above embodiment, the server 1 receives a request to produce a semiconductor device from the user terminal 2 and performs various types of processing based on the request, thereby placing an order with the aperture maker terminal 3 and the device maker terminal 4 and requesting these terminals to produce the semiconductor device. The present invention is not limited to this. FIG. 11 shows a modification to the above embodiment. As shown in FIG. 11, a relay server 111 can be provided between the server 1 and the user terminal 2 to transmit/receive the information shown in steps s1, s2, s3, s6, s7, s9 and s10 in FIG. 4 to/from the user terminal 2, request the server 1 to perform all the processes in steps s4, s5 and s8 (s1', s3', s7' and s10'). These processes (s4, s5, and s8) can be carried out by the server 1. In this case, the relay server 111 transmits the data received from the server 1 to the user terminal 2 (s2', s6' and s9'). Needless to say, the relay server 111 can perform any of the processes s4, s5 and s8 to share the processes with the server 1.

According to the present invention, the transfer of information between a person who places an order (user) and a person who receives an order (server) need not always be performed through the network. For example, the server may calculate user's required design parameters regarding a plurality of circuit patterns and provides the user with a list of the design parameters by paper to cause the user to select a user's desired circuit pattern. It is thus confirmed that the present specification contains the following invention:

A method of receiving an order for a semiconductor device and producing the semiconductor device based on information transferred between a person who wishes to receive an order and a person who wishes to place an order, comprises: causing the person who wishes to place an order to provide specifications of the semiconductor device by request of the person who wishes to place an order, generating a plurality of circuit patterns in consideration of conditions for transferring a pattern by electron-beam exposure of a character projection method based on the specifications of the semiconductor device, obtaining at least two design parameters for each of the circuit patterns, and presenting the design parameters to the person who wishes to place an order for each of the circuit patterns and causing the person who wishes to place an order to select a circuit pattern satisfying a desired condition.

As described in detail above, a semiconductor-device producing method according to the present invention allows a semiconductor device to be produced efficiently so as to fill the user needs Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of producing a semiconductor device upon receiving an order for the semiconductor device by transferring information between a person who wishes to receive an order and a person who wishes to place an order through a network, the method comprising:
    receiving, from a person who wishes to place an order, a plurality of specifications of the semiconductor device;
    generating a plurality of circuit patterns based on at least one of the specifications of the semiconductor device, the circuit patterns including a circuit pattern generated by using a stored character projection (CP) aperture for charged-particle beam exposure and a circuit pattern generated by using the stored CP aperture and a CP aperture to be newly produced, and obtaining a plurality of design parameters for each of the circuit patterns, and calculating a cost and a delivery time period for each of the circuit patterns, the cost including a cost for producing the CP aperture to be newly prepared;
    presenting said plurality of design parameters with the associated cost and the associated delivery time period for each of the circuit patterns to the person who wishes to place an order for each of the circuit patterns; and
    providing the semiconductor device to the person who wishes to place an order when at least one of the plurality of design parameters with the associated cost and the associated delivery time satisfies a desired condition.

2. The method according to claim 1, further comprising: requesting a device maker to generate the selected circuit pattern through the network after the circuit pattern is ordered by the person who wishes to place an order.

3. The method according to claim 1, further comprising: requesting a CP aperture maker to produce the CP aperture to be newly produced through the network after the circuit pattern is ordered by the person who wishes to place an order.

4. A method of producing a semiconductor device upon receiving an order for the semiconductor device based on information transferred between a person who wishes to receive an order and a person who wishes to place an order through a network, the method comprising:
    receiving, from a person who wishes to place an order, a plurality of specifications of the semiconductor device;
    transmitting the specifications of the semiconductor device to a server, and causing the server to generate a plurality of circuit patterns based on the specifications of the semiconductor device, the circuit patterns including a circuit pattern generated by using a stored CP aperture for charged-particle beam exposure and a circuit pattern generated by using the stored CP aperture and a CP aperture to be newly produced, and to obtain a plurality of design parameters for each of the circuit patterns;

receiving said plurality of design parameters from the server; and presenting said plurality of design parameters to the person who wishes to place an order for each of the circuit patterns and allowing the person who wishes to place an order to select a circuit pattern satisfying a desired condition.

5. A program product for causing a computer system to produce a semiconductor device upon receiving an order for the semiconductor device by transferring information between a person who wishes to receive an order and a person who wishes to place an order through a network, the program product comprising:

a recording medium; and first, second, and third instruction means which are operated by the computer system and are recorded on the recording medium, wherein the first instruction means provides the computer system with an instruction allowing the person who wishes to place an order to input specifications of the semiconductor device by request of the person who wishes to receive an order;

the second instruction means generates a plurality of circuit patterns based on the specifications of the semiconductor device, the circuit patterns including a circuit pattern generated by using a stored CP aperture for charged-particle beam exposure and a circuit pattern generated by using the stored CP aperture and a CP aperture to be newly produced, and obtains a plurality of design parameters for each of the circuit patterns; and the third instruction means presents said plurality of design parameters to the person who wishes to place an order for each of the circuit patterns and allows the person who wishes to place an order to select a circuit pattern satisfying a desired condition.

* * * * *